(No Model.)
E. F. BAENZIGER.
HEEL CLIP FOR BICYCLES.
No. 516,996. Patented Mar. 20, 1894.
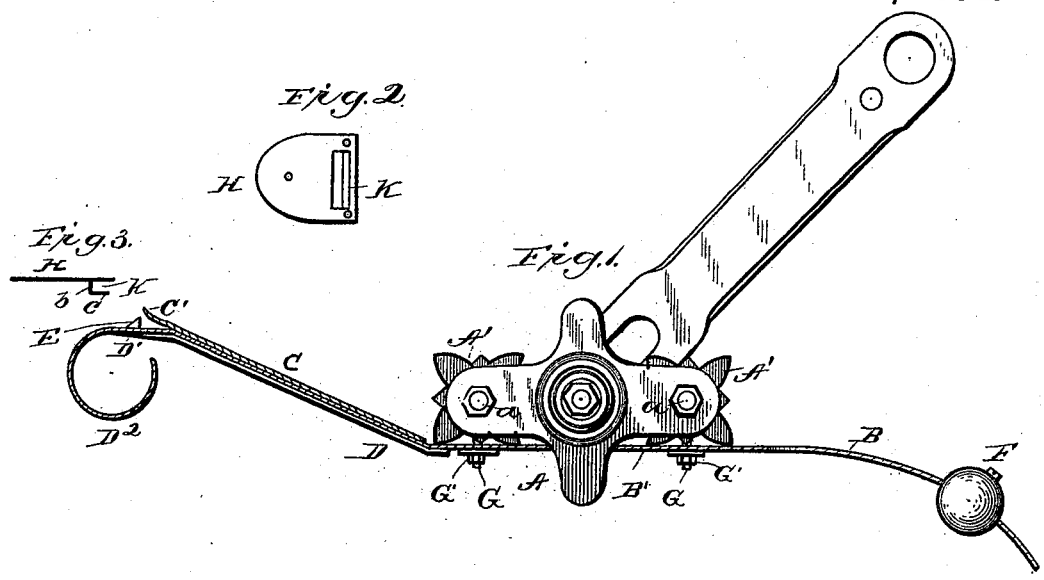
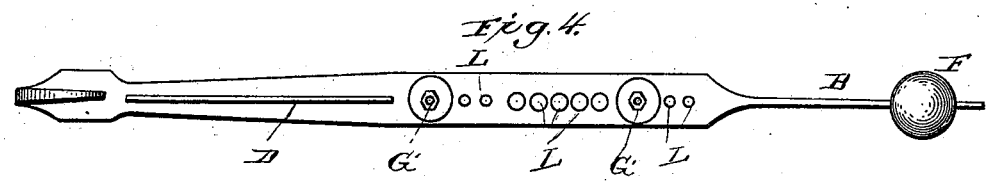
Witnesses:
J. M. Fowler Jr.
Helena Bauer
Inventor:
Emil F. Baenziger,
By Collamer & Co.,
Attorneys

UNITED STATES PATENT OFFICE.

EMIL F. BAENZIGER, OF NEW ORLEANS, LOUISIANA, ASSIGNOR TO LOUIS GERTEIS, OF SAME PLACE.

HEEL-CLIP FOR BICYCLES.

SPECIFICATION forming part of Letters Patent No. 516,996, dated March 20, 1894.

Application filed September 30, 1892. Serial No. 447,440. (No model.)

*To all whom it may concern:*

Be it known that I, EMIL FERDINAND BAENZIGER, a citizen of the United States, residing at New Orleans, in the parish of Orleans and State of Louisiana, have invented certain new and useful Improvements in Heel-Clips for Bicycles; and I do declare the following to be a full, clear, and exact description of the invention, such as will enable others skilled in the art to which it appertains to make and use the same.

My invention relates to improvements in devices for detachably connecting the shoes of a bicycle rider to the pedals of a bicycle so that a high speed may be attained without danger of the rider being thrown; and its novelty will be fully understood from the following description and claim when taken in connection with the accompanying drawings, in which—

Figure 1, is a side elevation of my improved device in position upon the pedal of a bicycle. Fig. 2, is an inverted plan view of a heel plate which forms part of my device. Fig. 3, is a side elevation of the same. Fig. 4, is a plan view of my device, removed from the pedal. Fig. 5, is a plan view of the heel plate, and Fig. 6, is a detail section illustrating the manner of connecting my improved device to the pedal.

In the said drawings, similar letters designate corresponding parts throughout the several views, referring to which—

A, indicates the pedal frame of a bicycle.

A', indicates the rubbers of the pedal.

a, indicates the bolts through the medium of which the rubbers A', are connected to the frame A; and B, indicates my improved device.

The body bar B', which is designed to be connected to the pedal frame and rest against the under side of the rubbers A', as shown, preferably has its forward portion curved and reduced, as better illustrated in Fig. 4, to receive a counter-balance weight F, which is designed and adapted to be adjusted and adjustably fixed, for a purpose presently described. This body bar B', also has its rear portion D, inclined upwardly as shown, so that the horizontal heel-supporting-platform D', will rest in a plane corresponding to or slightly higher than the plane of the upper surface of the rubbers A', and it has its extreme rear portion $D^2$, curved downwardly, forwardly, and upwardly, so as to prevent the heel plate (presently described) from engaging its end. The intermediate or middle portion of the bar B', which rests against the under side of the pedal rubbers A', is provided with a series of apertures L, for the passage of the connecting bolts G, which extend through recesses cut or formed in the rubbers A', and are provided at their upper ends with eyes g, designed and adapted to receive the bolts a, of the pedal frame A. The bolts G, have their outer ends threaded, as illustrated, to receive nuts G', which serve to hold the body bar B', on the bolts. By this construction it will be perceived that the body bar B', and its appurtenances may be readily connected with and may be as readily removed from the pedal, without the employment of skilled labor, and it will be further perceived that when so connected the body bar will not be liable to casual disconnection, which is a highly important advantage.

Connected at its forward end to the inclined portion D, of the bar B', is a clip C, which is formed from spring metal and is extended beyond the rear end of the portion D, and has its rear end bent upwardly as shown. This clip C, serves in conjunction with a beveled lug E, on the portion D', to hold the tongue K, of the heel plate H, which plate is designed to be connected to the heel of a shoe worn by the bicycle rider.

The tongue K, which is preferably struck from the plate H, comprises a depending portion b, and a forwardly extending portion c, whereby it will be seen that while it may be readily introduced between the clip C, and lug E, it cannot be disengaged except when the foot of the rider is raised. The interposing of this tongue between the clip C and lug E is accomplished by the rider simply first bearing down his heel so that the tongue K strikes upon the platform D' in rear of the lug E. Then by a sudden forward movement, the tongue is caused to ride up the rear inclined face of the lug E and under the free and upwardly bent rear end c' of the clip C; and after the angle of the portions c and b has passed over the corner of the lug E, the entire tongue K drops down in front of the lug with its forwardly extending portion c under the clip as will be clear.

By the provision of the body bar B', having the series of apertures L, before described, it will be seen that the device may be quickly and easily adjusted to fit feet of different sizes inasmuch as the portion D', may be fixed at various distances from the pedal.

By reason of the weight F, being adapted to be adjusted and adjustably fixed it will be seen that it may be adjusted in accordance with the adjustment of the bar B', so as to normally hold the device horizontal in its several positions.

It will be seen from the foregoing description that my improved device may be very cheaply manufactured, that it may be quickly and easily connected to the pedals of a bicycle; that it adds but little to the weight of the bicycle, and that it serves effectually to prevent the rider's feet from being disengaged from the pedals while traveling fast, which is a highly important desideratum.

I have specifically described the construction and relative arrangement of the several elements of my improved device, so as to impart a full understanding of the same, but I do not desire to be confined to such construction and arrangement as such changes or modifications may be made, in practice, as fairly fall within the scope of my invention.

I am aware that it is old in this art to provide the rear portion D with an upright stud and with the spring clip, and to form the heel plate with a single hole which can be passed over the stud while the free end of the clip passes over the front edge of the heel plate, and I do not claim the same; but What I do claim is—

In a device of the character described, the combination with a heel plate having a tongue comprising a portion extending downward below the heel and plate, and at its lower end a forwardly extending portion; of a body bar adjustably connected with the pedal of a cycle and having a flat platform at its rear extremity, a lug rising from said platform and having a smooth forwardly inclined rear face and a vertical front face forming an acute angle at its point, and a spring clip secured upon the body bar and having an upturned rear end standing in front of and slightly above the point of said lug, as and for the purpose set forth.

In testimony whereof I affix my signature in presence of two witnesses.

EMIL F. BAENZIGER.

Witnesses:
L. GERTEIS,
RICARDO DEE.